US006996441B1

(12) United States Patent
Tobias

(10) Patent No.: US 6,996,441 B1
(45) Date of Patent: Feb. 7, 2006

(54) FORWARD-LOOKING FAN CONTROL USING SYSTEM OPERATION INFORMATION

(75) Inventor: David F. Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 606 days.

(21) Appl. No.: 10/095,316

(22) Filed: Mar. 11, 2002

(51) Int. Cl.
*G05B 13/02* (2006.01)

(52) U.S. Cl. .......................... 700/44; 700/29; 700/30; 700/31; 700/45; 700/276; 700/278; 700/299; 700/300; 702/132; 713/300; 713/310; 713/320; 713/322; 361/687; 361/688; 361/695; 165/104.33; 236/DIG. 9

(58) Field of Classification Search ................ 700/276, 700/278, 299, 300, 29, 30, 31, 44, 45; 702/132; 713/300, 310, 320, 322; 361/687, 688, 695; 399/92; 165/80.3, 104.33; 454/184; 236/49.3, 236/DIG. 9; 62/259.2
See application file for complete search history.

(56) References Cited

U.S. PATENT DOCUMENTS

| | | | | |
|---|---|---|---|---|
| 4,804,557 A | * | 2/1989 | Anthony et al. ................ | 427/9 |
| 5,088,645 A | * | 2/1992 | Bell .......................... | 236/46 R |
| 5,422,806 A | * | 6/1995 | Chen et al. .................... | 700/29 |
| 5,490,272 A | * | 2/1996 | Mathis et al. ................ | 718/108 |
| 6,000,035 A | * | 12/1999 | Matsushima et al. ....... | 713/320 |
| 6,160,359 A | * | 12/2000 | Fleischmann ................ | 315/294 |
| 6,198,245 B1 | * | 3/2001 | Du et al. ...................... | 318/471 |
| 6,219,795 B1 | * | 4/2001 | Klein .......................... | 713/300 |
| 6,239,991 B1 | * | 5/2001 | Ajro et al. ..................... | 363/41 |
| 6,324,361 B1 | * | 11/2001 | Itoh et al. ...................... | 399/92 |
| 6,470,289 B1 | * | 10/2002 | Peters et al. ................. | 702/132 |
| 6,482,123 B2 | * | 11/2002 | Steeby ......................... | 477/98 |
| 6,600,328 B2 | * | 7/2003 | Ku .............................. | 324/678 |
| 6,646,877 B2 | * | 11/2003 | Willers et al. .............. | 361/695 |
| 6,665,163 B2 | * | 12/2003 | Yanagisawa ................. | 361/103 |
| 6,834,269 B1 | * | 12/2004 | Bueche ......................... | 705/56 |
| 2003/0200473 A1 | * | 10/2003 | Fung ........................... | 713/320 |

* cited by examiner

*Primary Examiner*—Anthony Knight
*Assistant Examiner*—Douglas Shute
(74) *Attorney, Agent, or Firm*—Zagorin O'Brien Graham, LLP

(57) ABSTRACT

Predictions may be made regarding heat removal requirements depending on certain operational characteristics of an information processing system which have been monitored over time. A fan may be controlled based on the observed operational characteristics and based on the predictions made regarding the heat removal requirements for the system. For example, system utilization by applications may be monitored, possibly along with system performance parameters such as power level and frequency. These and other operational characteristics may be used to predict heat generation so that a fan may be controlled to anticipate temperature changes and thereby flatten temperature curves over time. This may be done in addition to monitoring the ambient temperature of the system and reacting to temperature spikes that may have already occurred.

30 Claims, 4 Drawing Sheets

FORWARD-LOOKING FAN CONTROL USING SYSTEM OPERATION INFORMATION

BACKGROUND

1. Field of the Invention

The present invention relates to fan control and, more particularly, to fan control based on system operation information.

2. Description of the Related Art

Information processing systems such as computer systems often generate great amounts of heat which can be detrimental to the performance of such systems and which can even permanently harm such systems. Consequently, the controlled and harmless dissipation or removal of heat generated in such systems, and the avoidance of temperature swings, both instantaneous and absolute, are seemingly ubiquitous engineering challenges. Heat sinks are often used to avoid instantaneous temperature swings. Nonetheless, large swings may still occur without proper management of heat removal systems (e.g., fans).

Many systems include fans to increase the rate of heat removal. While the mere addition of a fan aids heat dissipation, proper control of a fan can help to optimize or improve heat removal. Proper use of fans can provide the potential for increased system performance, whether by making it possible to add a greater number of heat generating devices (e.g., microprocessors or other integrated circuits) or by making it possible to enhance the operation of such devices (e.g., at higher power levels and/or at higher frequencies).

The ambient temperature of the system is commonly used as an input for controlling fan speed. For example, hardware or software may detect that the temperature is above a certain threshold and then turn on a system fan in response to the temperature change that has already occurred. Such an implementation could then turn off the fan when the system cools down. A bit may be set in a control register when the sensor detects a temperature over the threshold. This, in turn, may cause an interrupt to occur, and an interrupt handler to turn on the fan.

Fans often have the ability to be operated at variable speeds via hardware-based pulse-width modulation (PWM) generators. Also, a thermistor may be used directly inline with the fan. The resistance of the thermistor changes with the heat, and thus controls the current in real time. This type of control may be integrated directly into the fan so that the system is otherwise unaware that fan control actions are occurring. In this implementation, the fan runs at a speed that corresponds to the temperature that has already occurred in the system. In the case of a CPU fan, the temperature of the heat sink as a whole is measured by the thermistor. The fan also changes speed at a rate that is proportional to the size of the heat sink. Larger thermal masses result in slower temperature changes.

In a typical system, when the performance of processing devices is increased, the devices heat up as a result. The ambient temperature of the system can be used to control a fan as described above, but such implementations cannot predict what the system temperature will be, since they have no knowledge of the power being dissipated by systems components.

The use of fans introduces a certain amount of noise to the end users of information processing systems. Unfortunately, fan noise can be a significant contributor to the quality of experience obtained by the end users of such systems. Fan noise may be conceptualized as being a product of two factors. First, fan noise can become disagreeably perceptible as a result of the absolute fan speed. If the fan is operating at a high speed, the fan will exhibit greater and more noticeable fan noise. Secondly, fan noise is more easily perceived by end users during speed changes of the fan. Thus, if the fan undergoes many speed changes, and if those speed changes take place in short periods of time, the fan noise can become disturbing for the end user. In contrast, low level, steady state noise, or noise resulting from slower speed changes, can be filtered out by the human brain.

SUMMARY

It has been discovered that past system operational characteristics such as power level and clock frequency, and such as processor utilization and operating system time slice utilization, may be used to predict heat removal requirements for the system. By predicting the heat removal requirements of a system, a heat removal subsystem may be advantageously controlled to anticipate temperature changes. Historical operational characteristics may be used in place of or in addition to the use of a contemporaneous, non-operational characteristic such as a temperature measurement.

For example, software can be used to predict heat removal requirements due to the average CPU power dissipation based on an average performance state over a period of time. A system fan or fans can be configured to run at selected speeds no greater than required to dissipate the predicted heat. The heat prediction may be based, for example, on the frequency and voltage at which the CPU is running or based on other system performance indicators. The fan speed can be increased or decreased slowly in response to the moving average indicators which provide advance warning of potential temperature swings. Sudden turning on and off of the fan or fans can be avoided using the software and method described herein. Temperature detection circuitry may also be used as a failsafe with this software and method. If the CPU hits a failsafe condition despite the use of this software and method, the CPU fan can be increased to a maximum speed to eliminate the overheat situation.

In one embodiment, a method is provided which monitors an operational characteristic of a system and predicts heat removal requirements for the system based on the operational characteristic. The monitoring of the operational characteristic may include, for example, monitoring utilization of a processor by applications executing at least in part on the processor of the system, monitoring at least one clock frequency of the processor, and/or monitoring at least one power level of the processor. The utilization monitoring may include, for example, monitoring an extent of time slice usage by the applications and/or monitoring a task queue established by an operating system of the processor. A running average of past clock frequency measurements and/or power level measurements may be generated. A fan or other heat removal device may be controlled responsive to the predicted heat removal requirements, and other power saving and performance improving actions may be taken such as altering the power and frequency of a processor. Failsafe temperature triggers may be used as well.

In another embodiment, a method is provided to control fan speed in a computer system. An operational characteristic of the computer system is periodically measured. A heat removal requirement of the computer system is predicted based at least in part on at least one past measurement of the operational characteristic. A fan is controlled to operate at a fan speed dependent at least in part on the predicted heat removal requirement.

In another embodiment, a method is provided to control a fan in an information processing system. The fan is controlled to operate at a speed determined at least in part by a prediction of future system operation based on historical operational information. At least part of the historical operational information is independent of temperature information.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

The above referenced figures and the following discussion are intended to provide details of at least one example of the invention and should not be taken to be limiting of the invention itself. Rather, any number of variations may fall within the scope of the invention which is properly defined in the claims following this description.

DESCRIPTION OF THE PREFERRED EMBODIMENT(S)

Figure 1:
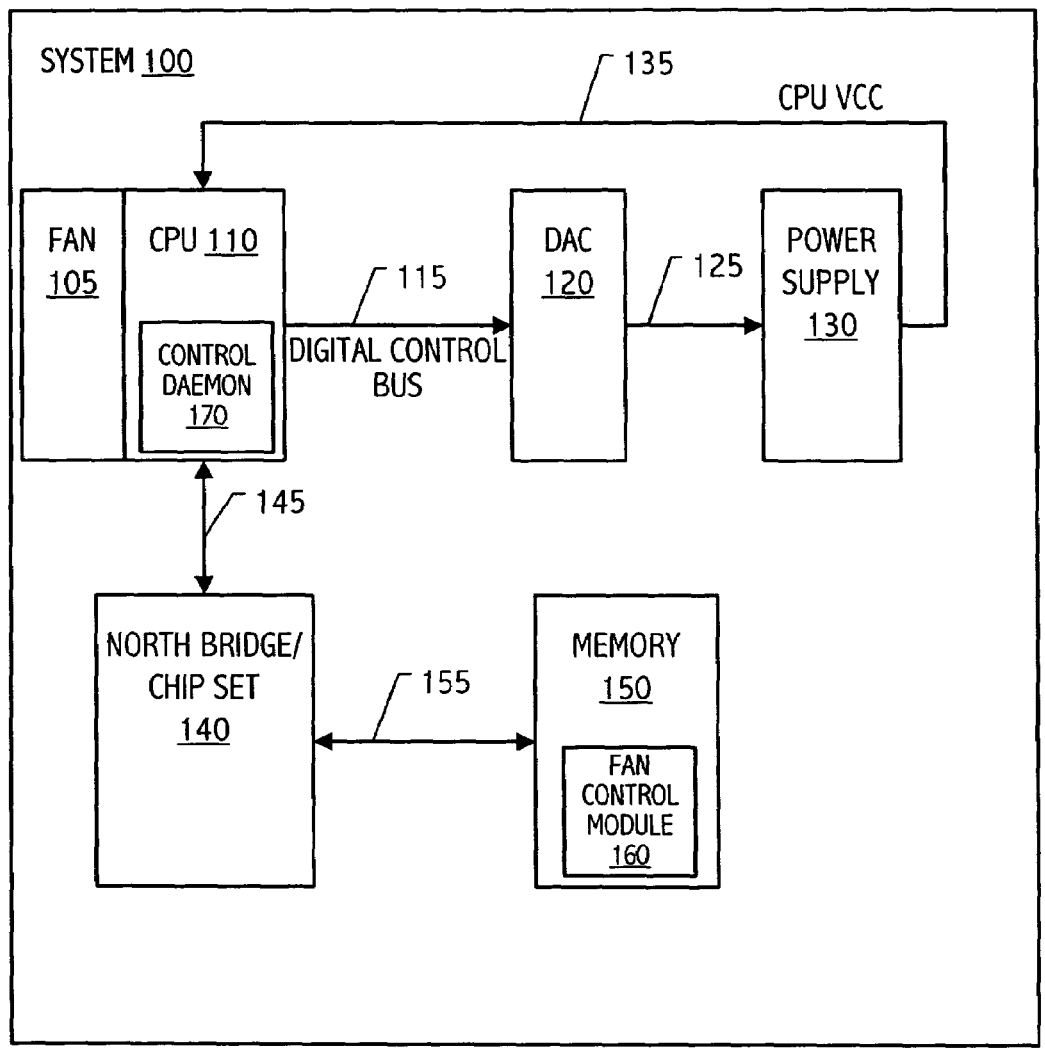
FIG. 1 is a block diagram of an information processing system including a fan control subsystem.

FIG. 1 shows an information processing system 100 including components for controlling the removal of heat from system 110. System 100 is any type of information processing system such as a computer system. For example, system 100 may be a portable computer system such as a laptop, or system 100 may be a server system or any other type of computer system.

System 100 includes central processing unit (CPU) 110, digital to analog converter (DAC) 120, power supply 130, north bridge 140, and memory 150. System 100 may include many other elements which are not shown to avoid confusion. All or most of these components typically generate heat in system 100.

System 100 also includes at least one heat removal component. For example, system 100 includes fan 105. Fan 105 is located within system 100 to remove heat from system 100 when fan 105 is operating. For example, as shown, fan 105 may be physically coupled to CPU 110 or to a heat sink on CPU 110, or the like. Fan 105 may be located elsewhere in system 100 such as in an opening in a chassis wall of system 100. System 100 may include more than one fan, and other types of heat removal components may be used in place of or in addition to fan 105.

As is described below, CPU 110 is coupled to provide a digital voltage identification signal to DAC 120 via digital control bus 115. The digital signal is determined at least in part by system/processor performance information. DAC 120 provides a corresponding analog control signal to power supply 130 via coupling 125. Power supply 130 is coupled to provide power to various components of system 100. For example, power supply 130 provides a controlled power supply signal CPU VCC to CPU 110 via supply line 135. In this way, CPU 110 can control the level of power received from power supply 130. CPU 110 is also coupled to north bridge/chip set 140 via front side bus and control coupling 145. North bridge 140 is coupled to memory 150 via bus 155. Note that although a "central" processing unit (i.e., CPU 110) is used in system 100, more than one processor may be used.

Memory 150 includes a fan control module 160. In the present embodiment, fan control module 160 is a software module stored in memory 150 for execution by CPU 110. Fan control module 160 may be a stand along module or a submodule of a power control module. Fan control module 160 (or some other portion of the power control module) initiates operation of a power control daemon "in" processor 120. The operation of system 100 under the influence of fan control module 160 and control daemon 170 is described further below with reference to FIGS. 2–3.

Figure 2:
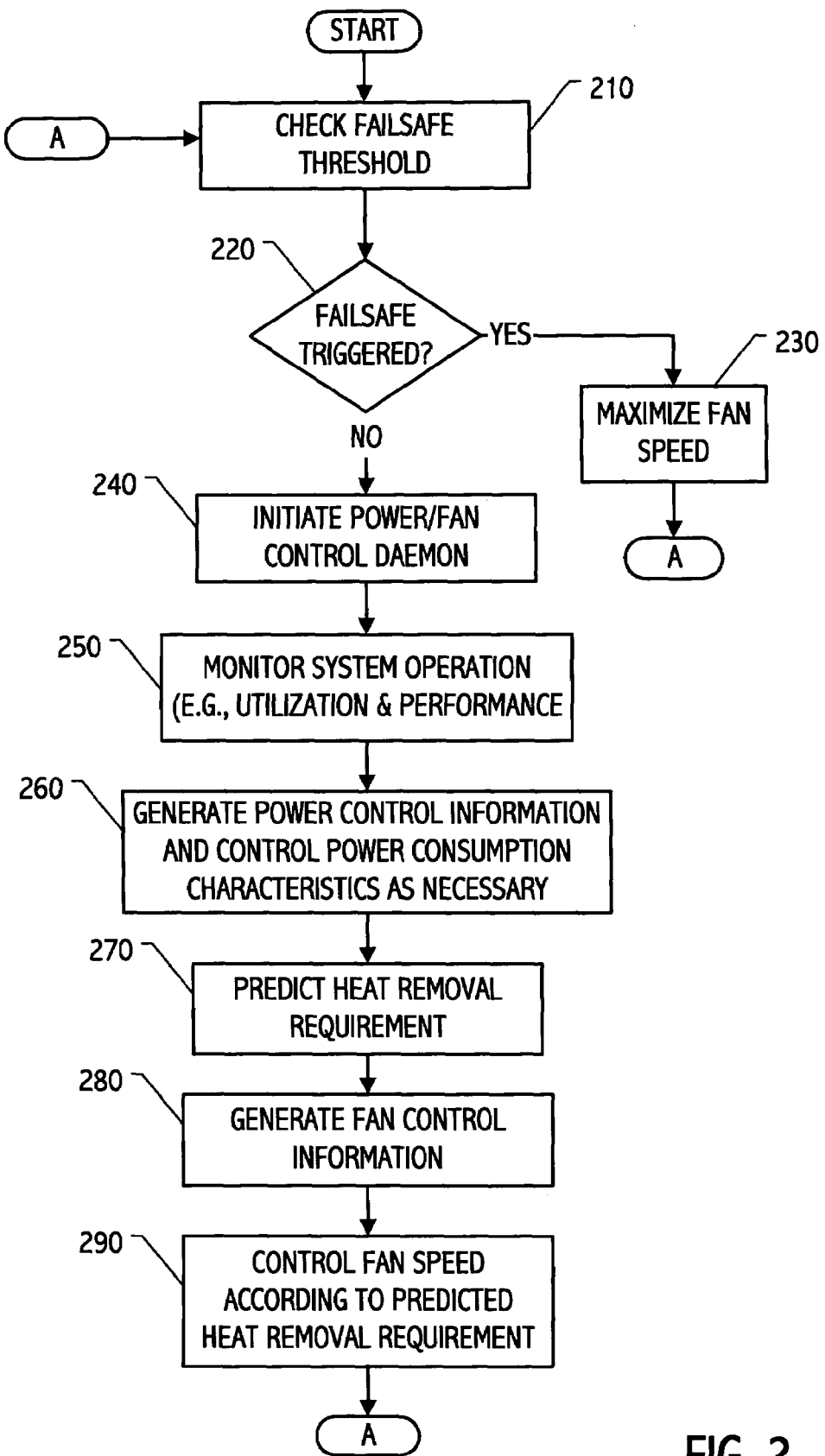
FIG. 2 is a flowchart showing exemplary fan control operations.

FIG. 2 is a flowchart illustrating an exemplary set of operations of system 100. During check failsafe threshold operation 210, a signal indicative of the temperature of system 100 is received and processed. If the value of the signal indicates a temperature over a failsafe temperature during decision 220, then the fan speed is maximized or otherwise instructed to drive toward a failsafe speed or range of speeds during maximize fan speed step 230. The failsafe temperature trigger value may be preset, programmed, or a combination of both. If no failsafe temperature condition is detected during decision 220, control transitions to control daemon initiation step 240.

During control daemon initiation step 240, execution of a control daemon is initiated. For example, a module such as fan control module 160 may initiate execution of control daemon 170 on CPU 110. The control daemon may be, for example, a multi-featured power control daemon or merely a fan control daemon.

After control daemon initiation step 240 and during system operation monitoring step 250, one or more operational characteristics of system 100 are monitored so that power control and fan control decisions may be made. This is in contrast to step 210 where a non-operational characteristic, the ambient temperature, is monitored instead of the operational characteristic(s) of system 100.

One type of operational characteristic which may be monitored during system operation monitoring step 250 is the utilization of CPU 110. The operating system and applications executing in system 100 may be monitored during operation 240 by control daemon 170 to determine the extent of utilization of the processing capability of the CPU by such applications. For example, the operating system of CPU 110 assigns time slices to various applications executing on CPU 110, and the operating system (OS) keeps performance statistics based on the time slices. Control daemon 170 samples information regarding the extent to which each application utilizes its time slice, for example, by periodically querying the OS scheduler for such utilization information. For example, if many applications are not utilizing their full time slice, then CPU 110 is being underutilized. If CPU 100 is being underutilized, then the performance of CPU 110 may be ratcheted down, with a corresponding effect on future heat generation. Thus, such utilization information is useful in making power conservation decisions and fan control decisions.

One way of measuring CPU utilization is to sample the currently pending process list provided by the operating system of the CPU. The CPU run time used by each process since the last sampling may be calculated along with the actual elapsed time since the last sampling. The ratio of used process time to elapsed time yields one type of utilization metric.

Another type of operational characteristic is CPU performance and/or performance history. The CPU performance may be monitored by control daemon 170 during step 250. Performance can be measured using various CPU characteristics. For example, the power supply voltage level CPU VCC is an indication of the performance of CPU 110. Another indicator of CPU performance is the current frequency of CPU 110. The voltage level and frequency may be varied together or independently at different times for power conservation purposes and for performance purposes. For example, during times where high performance is necessary, the frequency and power level may be increased, and during times where high performance is not necessary, the power level and frequency may be decreased to conserve power. CPU performance history may be monitored by continually or periodically measuring the performance of CPU 110 and maintaining, for example, a running average of performance measurements (e.g., the last three measurements) to describe the recent history of the CPU's power level and frequency.

Performance of CPU 110 is closely related to heat generation. Consequently, the current performance state and/or the recent performance history of CPU 110, and patterns thereof, are relevant to efficient control of heat removal systems such as fan 105 and to making predictions regarding the anticipated requirements for such heat removal system.

During power control step 260, power control information is generated to allow control daemon 170 or another application to take one or more actions depending on the operational observations made during step 250. For example, control daemon 170 can send a digital bit pattern or signal to DAC 120 indicating a measurement of CPU utilization and/or identifying a desired voltage level for CPU 110. DAC 120 then sends a power control signal to power supply 130 to control the power voltages used in system 100. This will allow the conservation of power by only using necessary power for the current or predicted utilization of the system. For example, if the system is being under-utilized (e.g., time slices are given back to the processor and are not being fully used by each application), the power voltage level can be lowered and/or the processor can be slowed down. Similarly, control daemon 170 can control a phase lock loop (PLL) within CPU 110 to select the frequency of clocks in CPU 110. Thus, if the CPU is being under utilized, power savings can be achieved by controlling the voltage and the frequency of CPU 110. One example of a system including power management based on system utilization is provided in a United States patent application entitled, "CPU Utilization Measurement Techniques for Use in Power Management," naming Evandro Menezes, David F. Tobias, Richard Russell and Morrie Altmejd as inventors, filed on Jul. 16, 2001, and assigned a Ser. No. 09/906,915, which application is incorporated herein by reference.

Control daemon 170 can monitor the OS and file system operating on CPU 110 to determine appropriate actions to take with regard to fan 105. When the power voltage level and the frequency of CPU 110 are lowered, not only does power consumption decrease, but heat generation also decreases. Thus, when CPU 110 is being under-utilized, heat generation in system 100 is typically decreasing, and the heat removal requirements are not as great during that time. Accordingly, fan 105 of system 100 may operate at decreased speeds, thereby achieving further power savings and thereby achieving a decrease in the amount of system noise perceptible by the user of the system.

Thus, after system operation monitoring step 250, a predictive algorithm may be applied to the utilization and/or performance information during heat removal prediction step 270. By analyzing the utilization and performance information in view of the predictive algorithm, fan control information may be generated during step 280. Using the fan control information, control daemon 170 or fan control module 160 may control fan 105 to operate at a speed in accordance with the current and/or predicted heat removal requirements during control fan step 290. These steps may be continually repeated for the duration of the operation of CPU 110.

Figure 3:
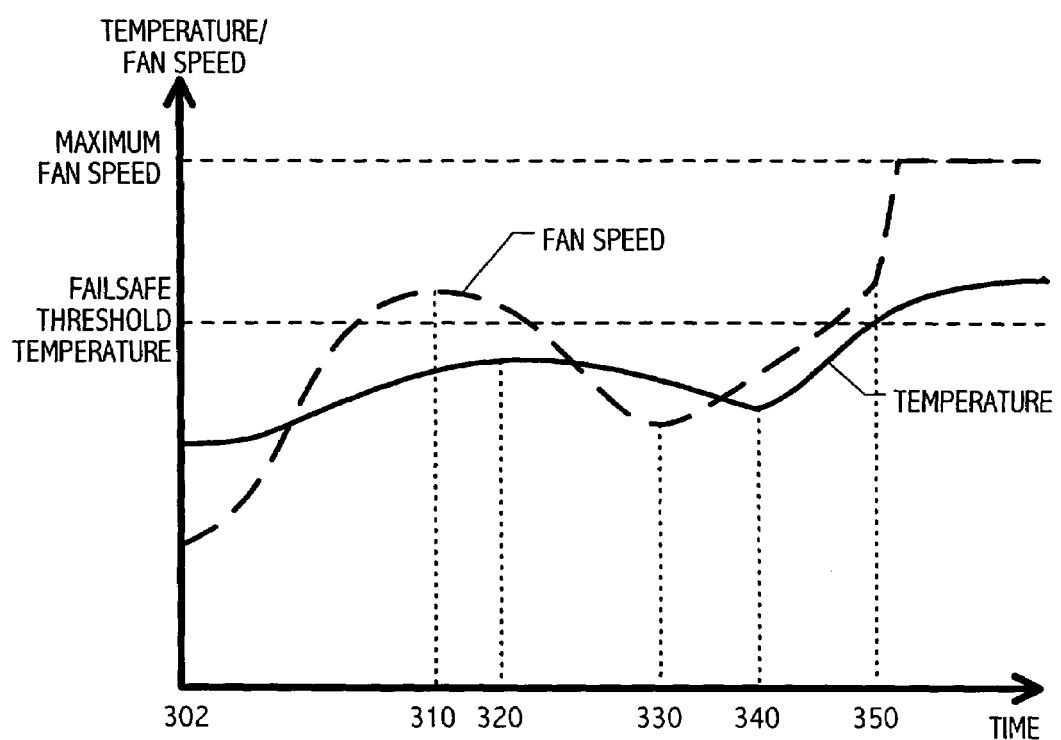
FIG. 3 is a time diagram showing exemplary fan control.

Referring to FIG. 3, when the system performance is increasing (e.g., power level and frequency increasing), the temperature of system 100 will increase. (e.g., as shown from time 302 to 320). While a more traditional system might react to the rising temperature by turning on the fan after the temperature rises, system 100 uses the operational information obtained during step 250 and the prediction(s) made during step 270 to gradually increase the speed of fan 105 in anticipation of a future, higher performance, and therefore a future, higher temperature. See, for example, the increasing fan speed from time 302 to time 310. At time 310, the speed of the fan reaches a relative maximum prior to the temperature reaching its relative maximum at time 320. By time 320, the fan has already begun to slow down starting at time 310 because a prediction has been made that the temperature will decrease given predicted utilization and performance of CPU 110, and possibly given the current fan speed. In the more traditional system mentioned above, a traditionally controlled fan might reach or remain at a maximum speed even after the temperature has started falling.

For further example, the fan is controlled at time 330 to again increase its speed before the temperature begins rising based on a prediction of higher performance which actually begins later at time 440. Note that at time 450, the actual temperature of the system reaches a threshold value despite the improved control of fan 105, and the fan speed is automatically maximized.

Figure 4:
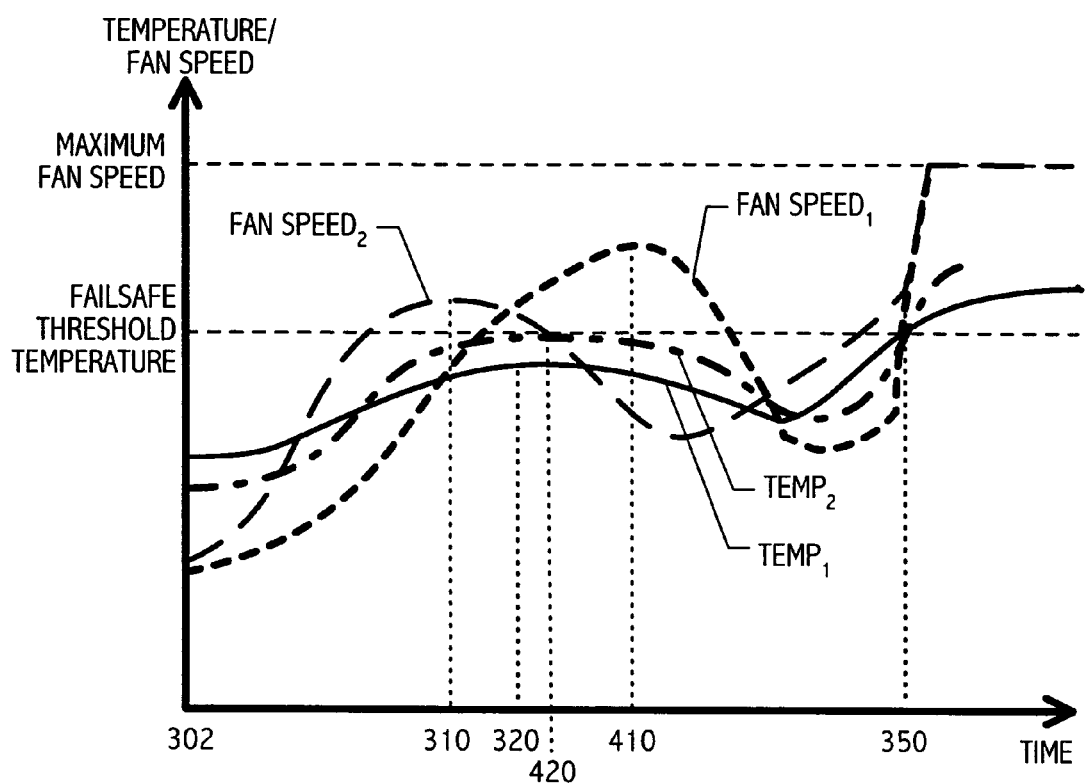
FIG. 4 is a time diagram showing the exemplary fan control of FIG. 3 in comparison with traditional fan control.

FIG. 4 shows the temperature and fan speed curves (FAN SPEED$_1$ and TEMP$_1$) of FIG. 3 superimposed with a second set of temperature curves (FAN SPEED$_2$ and TEMP$_2$). The second FAN SPEED$_2$ curve is representative of a prior art fan implementation in which the control of the fan speed follows, rather than predicts, the prior art temperature curve TEMP$_2$. Accordingly, when the system performance is increasing, the temperature of a traditional system will increase as shown by TEMP$_2$ from time 302 to 420. In this case, the traditional system reacts to the temperature represented by TEMP$_2$ by increasing fan speed after the temperature rises. This is shown by the curve FAN SPEED$_2$ rising after the rising of curve TEMP$_2$ from time 302 to time 420. At time 420, the temperature of the traditional system reaches a relative maximum prior to FAN SPEED$_2$ which reaches its relative maximum at the later time 410. This has the effect of allowing the prior art temperature TEMP$_2$ to rise to an absolute value higher than TEMP$_1$.

Thus, fan control module 160 and control daemon 170 allow the prediction of the extent to which heat will have to be removed from system 100. Such a heat removal prediction allows control of fan 105 so that it does not rotate at a speed higher than necessary and so that it does not change speeds any more than necessary. The requirement for removing heat may be predicted by predicting the level of operation of the system. As the CPU is more heavily utilized, and/or as the CPU voltage level goes up and as the frequency of the CPU increases, the heat removal requirements of the overall system increase. Thus, if control daemon 170 can determine from the operational information when these operational characteristics will increase, control daemon 170 can use that information to anticipate necessary changes in fan speed and act proactively instead of reactively. For example, fan 105 can be ramped up early to maintain the temperature at a more steady level than is possible in more conventional systems which react to temperature changes that have already occurred.

There is no need to wait for the heat sink to heat up as with prior systems. If the system knows or predicts that the CPU is going to be handle some intensive application, the system starts moving the fan up in advance of the heat sink actually getting hot. Thus, the heat sink never gets as hot as it could given the high intensity application that is running, and the heat sink does not stay at a peak temperature for as long. The temperature curve is effectively flatter. A flat temperature curve is good for the silicon and for human factors due to a decrease in the detectable fan noise. In essence, the above described embodiments generate a predicted temperature value to which the heat sink temperature will rise even though the heat sink temperature hasn't gotten there yet. This is done based on the power being pumped into the processor, for example, as opposed to strictly relying on other, non-predictive factors such as current ambient system temperature.

Since smaller heat sinks allow quicker temperature swings in prior art systems, mobile and embedded systems (which tend to be small and therefore do not typically have large heat sinks) gain a significant advantage by implementing the above described embodiment. As heat sinks get smaller, systems incorporating such heat sinks benefit more and more from the solutions described herein.

Usage models can be generated to make predictions of CPU operation based on the history of the operation of the CPU. Thus, the history of the processor can be used to predict the future performance of the processor, and accordingly, to predict the future heat removal requirements of the system and thereby prevent certain heat conditions from ever occurring. This is in contrast to the prior art which typically uses temperature sensors to determine the current temperature of the system so that the fan may be turned on to assuage a heat condition which has already occurred. Predictive heat removal and power conservation are particularly useful in mobile systems, and may also be useful in server farms which include rooms full of CPU racks generating great amounts of heat.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

For example, while these heat removal software and management systems described herein are described in the context of fan control systems, other systems may be used, such as direct cooling systems and refrigeration systems.

The foregoing components and devices are used herein as examples for sake of conceptual clarity. As used in this description, these specific exemplars are intended to be representative of their more general classes. Furthermore, in general, the use of any specific exemplar herein is also intended to be representative of its class and the noninclusion of any specific devices in any exemplary lists herein should not be taken as indicating that limitation is desired.

In one embodiment, system 100 is a computer system such as a personal computer system, laptop or even a computer server system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Those skilled in the art will recognize that boundaries between logic blocks are merely illustrative and that alternative embodiments may merge logic blocks or circuit elements or impose an alternate decomposition of functionality upon various logic blocks or circuit elements. Moreover, alternative embodiments may combine multiple instances of a particular component. For example, in the above described embodiment, multiple processors may be used, and multiple fans may be used. Similarly, those skilled in the art will recognize that boundaries between the functionality of the steps and operations shown in FIG. 2 and described above are merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

Except as otherwise stated, the operations discussed herein may consist of steps carried out by system users, hardware modules and/or software modules. Thus, the operations referred to herein may correspond to modules or portions of modules (e.g., software, firmware or hardware modules). For example, although the described embodiment includes software modules, the various exemplary modules may be application specific or general purpose hardware modules. The software modules discussed herein may include script, batch or other executable files, or combinations and/or portions of such files. The software modules may include a computer program or subroutines thereof encoded in computer-readable media. The functionality of operations referred to herein may correspond to the functionality of modules or portions of modules in various embodiments.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

Each of the blocks/operations of FIG. 2 may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by system 100, for example, from computer readable media 150. Computer readable media 150 may be permanently, removably or remotely coupled to computer system 100. Computer readable media 150 may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including computer networks, point-to-point telecommunication equipment, and carrier wave transmission media, just to name a few. Other new and various types of computer-readable media may be used to store and/or transmit the software modules discussed herein.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method comprising the steps of:
    monitoring an operational characteristic of a system; and
    predicting heat removal requirements for the system based on the operational characteristic,
    wherein the monitoring comprises
        periodically measuring a clock frequency of the processor, and generating a running average of past clock frequency measurements to provide the operational characteristic.

2. A method comprising the steps of:
monitoring an operational characteristic of a system; and
predicting heat removal requirements for the system based on the operational characteristic,
wherein the step of monitoring the operational characteristic of the system comprises the steps of:
periodically measuring a power level of the processor; and
generating a running average of past power level measurements to provide the operational characteristic.

3. The method of claim 1 wherein the step of predicting includes processing historical information representative of the operational characteristic using software code representative of a predictive algorithm to generate fan control information.

4. The method of claim 1 further comprising the step of generating heat removal control information representative of the predicted heat removal requirements.

5. The method of claim 4 further comprising the step of sending the heat removal control information to a heat removal controller.

6. The method of claim 4 further comprising the step of controlling a heat removal device to remove heat from the system in a manner determined at least in part by the heat removal control information.

7. The method of claim 4 further comprising the step of controlling a fan to operate at a speed determined at least in part by the heat removal control information.

8. The method of claim 1 further comprising the step of initiating a control daemon in the system for monitoring the operational characteristic of the system and for predicting the heat removal requirements for the system.

9. The method of claim 1 further comprising the steps of:
generating power control information; and
controlling a processor in the system to operate in a mode determined at least in part on the power control information.

10. The method of claim 9 wherein the controlling the processor comprises at least one of the steps of:
controlling at least one clock of the processor to operate at a frequency determined at least in part by the power control information; and
controlling a power supply level of the processor to have a value determined at least in part by the power control information.

11. The method of claim 1 further comprising the steps of configuring the system so that a heat removal device is triggered to operate in a failsafe mode upon detecting a temperature greater than a threshold.

12. The method of claim 11 further comprising the steps of:
detecting a temperature greater than the threshold; and
triggering a fan to operate at a maximum speed upon detecting the temperature in the system.

13. A method for controlling fan speed in a computer system, the method comprising the steps of:
periodically measuring an operational characteristic of the computer system;
predicting a heat removal requirement of the computer system based at least in part on at least one past measurement of the operational characteristic; and
controlling a fan to operate at a fan speed dependent at least in part on the predicted heat removal requirement.

14. An apparatus comprising:
at least one computer readable medium;
encoded information on the at least one computer readable medium for monitoring an operational characteristic of a system; and
encoded information on the at least one computer readable medium for predicting a heat removal requirement for the system based on the operational characteristic,
wherein the encoded information for monitoring includes encoded information for periodically measuring the operational characteristic,
wherein the encoded information for predicting includes encoded information for predicting the heat removal requirement based on more than one past measurement of the operational characteristic.

15. The apparatus of claim 14 further comprising encoded information on the at least one computer readable medium for controlling a fan to operate at a fan speed dependent at least in part on the predicted heat removal requirement.

16. The apparatus of claim 14 wherein the encoded information for monitoring comprises at least one of:
encoded information for monitoring utilization of a processor by applications executing at least in part on the processor of the system; and
encoded information for monitoring performance of the processor.

17. The apparatus of claim 16 wherein the encoded information for monitoring the utilization of the processor comprises at least one of:
encoded information for monitoring an extent of time slice usage by the applications; and
encoded information for monitoring a task queue established by an operating system of the processor.

18. The apparatus of claim 16 wherein the encoded information for monitoring the performance of the processor comprises at least one of:
encoded information for monitoring at least one clock frequency of the processor; and
encoded information for monitoring at least one power level of the processor.

19. The apparatus of claim 16 wherein the apparatus is a computer system further comprising the processor, wherein the processor is coupled to the at least one computer readable medium.

20. An apparatus comprising:
at least one computer readable medium;
encoded information on the at least one computer readable medium for monitoring an operational characteristic of a system; and
encoded information on the at least one computer readable medium for predicting a heat removal requirement for the system based on the operational characteristic,
wherein the encoded information for monitoring the operational characteristic of the system comprises,
encoded information for periodically measuring a clock frequency of the processor, and
encoded information for generating a running average of past clock frequency measurements to provide the operational characteristic.

21. An apparatus comprising:
at least one computer readable medium;
encoded information on the at least one computer readable medium for monitoring an operational characteristic of a system; and
encoded information on the at least one computer readable medium for predicting a heat removal requirement for the system based on the operational characteristic, wherein the encoded information for monitoring the operational characteristic of the system comprises, encoded information for periodically measuring a power level of the processor, and encoded information for generating a running average of past power level measurements to provide the operational characteristic.

22. The apparatus of claim 14 further comprising encoded information on the at least one computer readable medium for generating heat removal control information representative of the predicted heat removal requirements.

23. The apparatus of claim 22 further comprising encoded information on the at least one computer readable medium for sending the heat removal control information to a heat removal controller.

24. The apparatus of claim 23 further comprising the heat removal controller.

25. The apparatus of claim 22 further comprising encoded information on the at least one computer readable medium for controlling a heat removal device to remove heat from the system in a manner determined at least in part by the heat removal control information.

26. The apparatus of claim 25 further comprising the heat removal device.

27. The apparatus of claim 25 wherein the heat removal device is a fan configurable to operate at a speed determinable at least in part by the heat removal control information.

28. The apparatus of claim 14 further comprising:

encoded information on the at least one computer readable medium for generating power control information; and encoded information on the at least one computer readable medium for controlling at least one clock of the processor to operate at a frequency determined at least in part by the power control information; and encoded information on the at least one computer readable medium for controlling a power supply level of the processor to have a value determined at least in part by the power control information.

29. The apparatus of claim 14 further comprising:

a detector for detecting a temperature greater than a threshold; and a trigger for triggering a fan to operate at a maximum speed upon detecting the temperature in the system.

30. The apparatus of claim 14 wherein the encoded information is encoded using at least one computer readable medium, the at least one computer readable medium including at least one of the group consisting of:

a storage medium, the storage medium including at least one of the group consisting of a magnetic disk, a magnetic tape, optical disk, semiconductor memory; and a transmission medium, the transmission medium including at least one of the group consisting of a wireline network and a wireless network.

* * * * *